Jan. 7, 1969　　　　P. L. CHORNEY　　　　3,420,455
WASTE DISPOSAL UNIT
Filed May 12, 1966
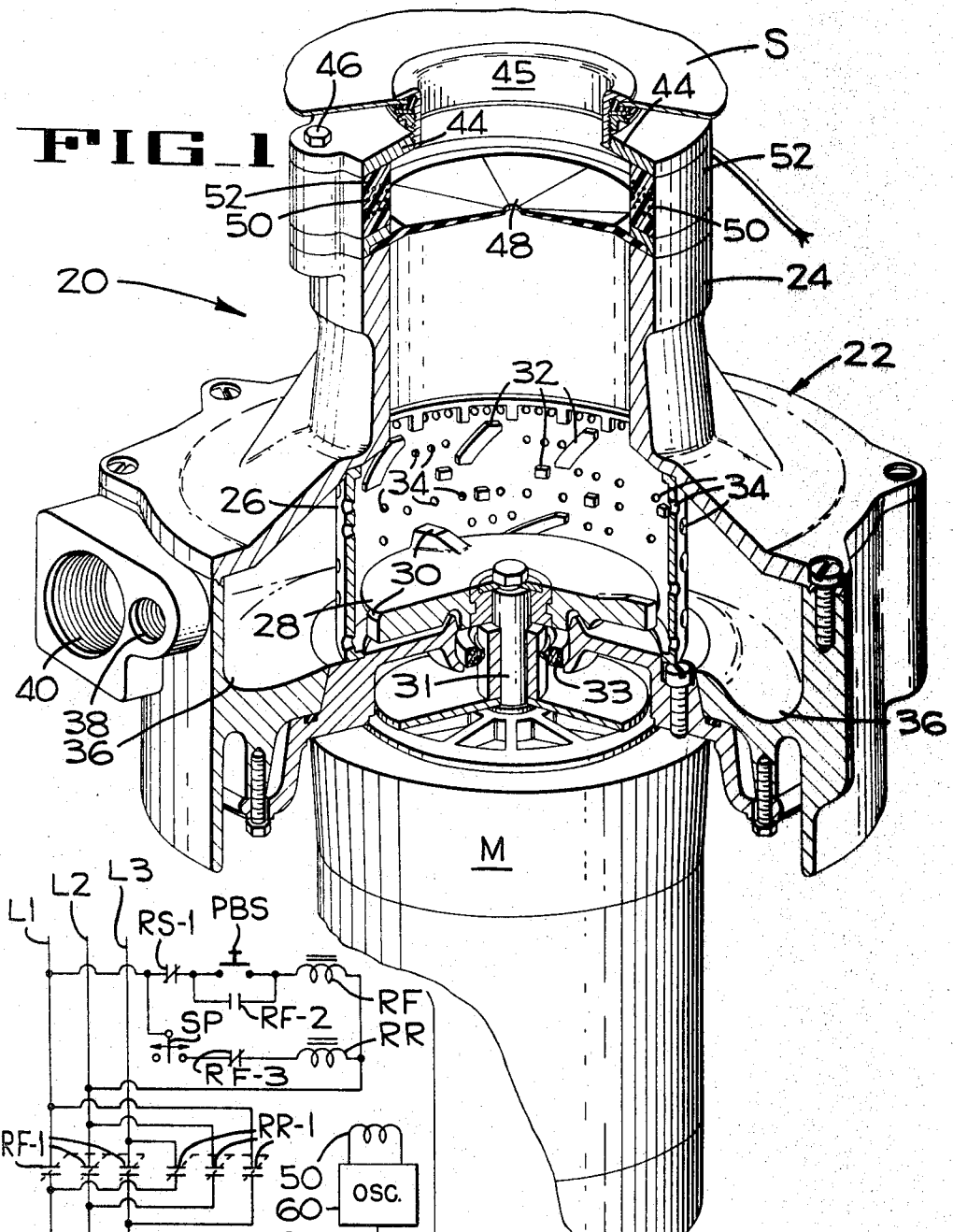
FIG_1
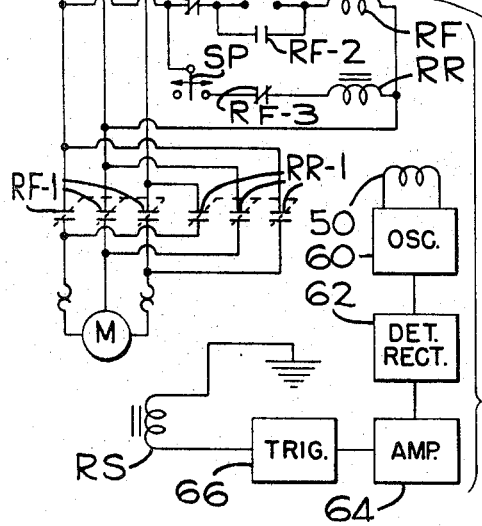
FIG_2
INVENTOR
PETER L. CHORNEY
BY *Francis W. Anderson*
ATTORNEY ns Patent Office 3,420,455
Patented Jan. 7, 1969

3,420,455
WASTE DISPOSAL UNIT
Peter L. Chorney, Hoopeston, Ill., assignor to FMC Corporation, San Jose, Calif., a corporation of Delaware
Filed May 12, 1966, Ser. No. 549,688
U.S. Cl. 241—46                      2 Claims
Int. Cl. B02c 21/00; E03c 1/266

ABSTRACT OF THE DISCLOSURE

A waste disposal unit of the type found in kitchen sink drains has an induction coil placed about its entrance throat to create a detectable signal when a metallic item, such as a knife or fork, is inadvertently received in the throat, said signal being used to stop the action of the comminuting elements of the disposal unit to prevent damage thereto and to the metallic item.

---

The present invention pertains to waste disposal units and more particularly to waste disposal units of the type found in sink drains for disposing of food waste and refuse or the like.

Waste disposal units of the comminuting type have achieved widespread usage today both in the ordinary household kitchen and in large-scale food preparation centers such as restaurant and hotel kitchens or military mess halls. As is well known, these units are adapted to be placed about the drains of sinks or food preparation basins to collect, comminute, and pass into the sewage system food waste and other refuse. Generally, these units comprise a tubular conduit or hopper adapted to be attached directly to the drain, the conduit including at or near its lower end a narrow discharge passage or series of small discharge outlets capable of passing only liquids and particles not subject to plugging the sewer lines. Also located within the conduit is some type of power driven cutting member which serves to reduce to particle size or pulverize those materials in the conduit.

A problem common to such waste disposal units is their susceptibility to the introduction of silverware or other small metallic items into their grinding chambers along with the food scraps and other waste matter. These hard metallic items, which may be at the bottom of the sink or dishwashing basin, are quite often inadvertently dislodged into the waste disposal unit where they may cause extensive damage. Not only will the silverware itself usually be severely gouged by the rapidly rotating cutting member or impeller and thereby rendered unusable, but also the cutting edges of the comminuting structure will be blunted, and there is a distinct possibility of further serious damage to the motor or other parts of the disposal unit.

It is therefore the primary object of the present invention to provide a waste disposal unit which has a means for instantly detecting the presence of silverware or other metallic objects when they enter the disposal unit and for stopping or suspending the power driven comminuting action of the unit before there is damage either to the silverware or to the unit itself.

This and other objects and advantages of the present invention will become more apparent from the following description and the accompanying drawing, in which:

FIGURE 1 is a perspective of the waste disposal unit of the present invention with a portion thereof being broken away.

FIGURE 2 is a schematic diagram of the detector and motor control circuitry.

Referring more particularly to the drawing, FIGURE 1 shows a waste disposal unit 20 of a conventional type which is seen to comprise a drive motor M and a housing 22 including an upper cylindrical portion 24 forming an entrance throat or hopper which is adapted to be placed about the drain of a sink S. Waste water and food material entering the throat 24 are passed therethrough to an apertured shredder ring 26 and a rotary cutting member 28 which together form the comminuting structure of the disposal unit. The solid materials within the shredder ring are broken up or pulverized by cutting teeth 30 on both the upper and lower faces of the rotor 28 and by lugs or shredding bars 32 on the interior face of the shredder ring 26. The resultant waste water, particles and pulverized material under centrifugal force pass outwardly through the apertures 34 in the shredder ring to an annular discharge passage 36 which extends within the lower portion of the housing 22. The discharge passage is provided with a water inlet 38 which, by an angle passage not shown, directs a continuous stream of water in a counterclockwise direction (as viewed in FIGURE 1) so as to direct the waste water and particulate matter in the discharge passage to an outlet 40 which may be connected to a sewer line. The rotary cutting member 28 is driven by an electric motor M which is placed below the housing and which may be of any conventional type. For the purposes of the present invention, the motor will be considered to be a standard three phase induction motor. The motor drive shaft 31 which mounts the cutting member is sealed at 33 with the housing.

The throat 24 of the housing 22 has at its uppermost end a closure cap ring 44 which is threadedly connected to a flanged sleeve sink adapted 45 that is tightly clamped to the drain opening of the sink S. The closure cap ring 44 is clamped to the main body of the throat 24 by cap screws 46 which also serve to clamp a slitted flexible diaphragm 48 across the entrance to the throat to act as a splash guard and prevent the ejection of material from the grinding chamber.

All of the above described structure is more or less conventional in waste disposal units, and for a further description of the details of the structure and operation of the particular waste disposal unit shown, reference is herein made to United States Patent No. 3,236,462 to Rolla J. Stout, assigned to the assignee of the present invention.

In accordance with the present invention, an induction or detector coil 50 is placed about the entrance to the throat 24 well above the grinding chamber and cutting member 28 for the purpose of detecting metallic objects and providing a signal for stopping the motor M before any damage can be done. The coil is sealed within a suitable insulating material 52, such as an epoxy resin for example, and tightly clamped between the closure cap ring 44 and the upper end of the throat 24 by the cap screws 46. When an alternating electric current is passed through the coil, a pulsating magnetic field is created within the throat. This field is altered whenever objects of high conductivity, such as a silver or aluminum utensil, or high magnetic permeability, such as a steel utensil, are passed into the throat between the turns of the coil. In either case, the impedance, or inductance, of the coil will be changed, since the objects of high conductivity will set up a field opposed to the field of the coil as they pass therethrough while the paramagnetic materials will increase the inductive impedance by providing a better path for the magnetic flux. It will be noted that the normal, harmless materials that will be passed through the magnetic field of the coil (e.g., waste water, food scraps, paper, etc.) are neither good conductors nor paramagnetic and hence they will have no effect upon the field. The metallic materials which are prone to cause damage will however fall into one or both of these categories. The change in the impedance of the coil caused by a metallic object may be detected by means of available circuitry and a signal generated to stop the disposal unit driving motor before the object can be damaged by or do damage to the comminuting structure at the lower end of the unit.

There are several alternative methods readily available to those skilled in the art for utilizing the change in impedance of a detector coil for creating a usable signal, and no invention is predicated upon the selection of any particular circuitry for accomplishing this purpose. Proximity detectors for use in locating buried metallic objects or for article sensing in material handling systems have been in use for many years and their principles of operation, as well as their specific circuitry, are quite well known. For example, one possible method would involve using the detector coil as one leg of an A.C. Wheatstone bridge which would become unbalanced when the impedance of the coil is changed. The unbalance current would be amplified and used to trigger a device to stop the motor. Another possible method would involve using the coil 50 in a tuned tank circuit followed by a band reject or notch filter where the detuning of the coil would permit a signal to pass through the filter and trigger a device to stop the motor.

In the embodiment shown in FIGURE 2, the detector coil 50 is used as part of a tank circuit in an oscillator 60. During normal operating conditions the output of the oscillator will be constant. When a metallic object falls between the turns of the detector coil, the Q of the tank circuit is changed and there is a corresponding change in the magnitude of the output of the oscillator. This change from the steady-state condition is detected by a detector rectifier 62 which causes a signal pulse to be fed through an amplifier 64 to a triggering circuit 66 which, when energized, will actuate a relay RS. A specific circuit functioning in this manner is shown and fully described in Handbook of Industrial Electronic Control Circuits by Markus and Zeluff, pp. 120–121, McGraw-Hill Book Company, 1956.

The actuation of relay RS can be used to operate a mechanical braking device. However, for the purposes of the present invention, it is preferred to use a form of dynamic braking by plugging the motor through conventional control circuitry such as that shown in FIGURE 2, for example. Motor M is shown as a three phase induction motor drawing current from lines L–1, L–2 and L–3. When the motor is started, the push button PBS is depressed to operate relay RF which closes the set of contacts RF–1 to provide forward driving current in the lines L–1, L–2 and L–3 to operate the motor. Relay RF also serves to close the normally open contact RF–2 to maintain current to the motor and to open the normally closed contact RF–3 in the reversing line.

When the relay RS is energized by the insertion of a metallic object within the turns of the induction coil 50 as previously explained, the normally closed contact RS–1 in the forward drive line is opened to disconnect the motor from its source of forward driving power. The simultaneous loss of current in relay RF causes contact RF–2 to open and the interlocked contact RF–3 to close. A circuit will now be closed in the reversing line through the relay RR, the now-closed contact RF–3, and a conventional plugging or zero-speed switch SP which remains closed while the motor is running in the forward direction. The energization of relay RR closes the set of contacts RR–1 which reverses the direction of the line current in L–1 and L–3 so that the motor M is now connected for running in the reverse direction. Contacts RF–1 and RR–1 are mechanically interlocked so that they may not be both closed at the same time. With the motor starter connections thus reversed, the motor develops a countertorque opposed to the load torque which results in a very rapid retardation. When the motor speed has dropped to nearly zero, the plugging switch SP opens to break the current through the relay RR and open the contacts RR–1. The motor is at this time disconnected from the line and at a complete, or nearly complete, stop.

It will thus be seen that the motor operating the grinding or cutting elements of the waste disposal unit can be very quickly brought to a stop once the coil has detected the presence of a metallic object within the entrance of the throat of the unit. The motor is stopped before the metallic object can be battered by the impeller teeth and destroyed. The person who is working with the apparatus will, of course, know that the stopping of the motor was due to the insertion of a metallic object within the unit housing, and he will therefore check for and remove the object before starting the motor again. It will be appreciated that this device will result in substantial savings in reducing the cost of replacing the silverware or other small items as well as in the cost of repairs to the waste disposal unit itself.

If it is desired to detect the passage of metallic objects through the throat 24 of the disposal unit when the motor M is not operating, a holding circuit including a normally closed reset pushbutton can be connected with the relay RS so that the relay RS will remain energized after passage of the object through the throat and keep the contact RS–1 open to prevent the subsequent starting of the motor with the pushbutton PBS. Such a system would, of course, require the operability of the control circuitry 60–66 during those times when detection is desired and the motor M is not running.

While one embodiment of the present invention has been shown and described it will be understood that various changes and modifications may be made therein without departing from the spirit of the invention or the scope of the appended claims.

The invention having thus been described, what is believed to be new and desired to be protected by Letters Patent is:

1. In a waste disposal unit having an upper entrance conduit, a lower grinding chamber, and power driven comminuting means in said grinding chamber for comminuting waste materials which have passed through said entrance conduit, the improvement comprising an induction coil arranged so as to surround said entrance conduit, means for electrically insulating said coil from said disposal unit and from the material passing through said entrance conduit, electrical circuitry connected to said coil to detect a change in its inductance, and means responsive to said circuitry for suspending the action of said power driven comminuting means when a metallic object of relatively high conductivity or magnet permeability is received in said entrance conduit within the plane of said coil.

2. In a waste disposal unit as set forth in claim 1 including a splash guard at least partially blocking said entrance conduit to prevent the ejection of material from said grinding chamber, said coil being positioned in said entrance conduit above said splash guard.

References Cited

UNITED STATES PATENTS 3,081,042   3/1963   Moskovitz _____ 241—36

HARRISON L. HINSON, *Primary Examiner.*

U.S. Cl. X.R.

241—36, 100.5